Sept. 13, 1932.　　　　F. H. OWENS　　　　1,877,033
SOUND REPRODUCING ATTACHMENT FOR MOTION PICTURE PROJECTORS
Filed Sept. 9, 1929　　2 Sheets-Sheet 1

INVENTOR.
FREEMAN H. OWENS.
BY *Philip S. Hopkins*
ATTORNEY.

Sept. 13, 1932.  F. H. OWENS  1,877,033
SOUND REPRODUCING ATTACHMENT FOR MOTION PICTURE PROJECTORS
Filed Sept. 9, 1929  2 Sheets-Sheet 2

INVENTOR.
FREEMAN H. OWENS.
BY
ATTORNEY.

Patented Sept. 13, 1932

1,877,033

UNITED STATES PATENT OFFICE

FREEMAN H. OWENS, OF NEW YORK, N. Y., ASSIGNOR TO OWENS DEVELOPMENT CORPORATION, OF NEW YORK, N. Y., A CORPORATION OF NEW YORK

SOUND REPRODUCING ATTACHMENT FOR MOTION PICTURE PROJECTORS

Application filed September 9, 1929. Serial No. 391,383.

My invention relates to a sound reproducing attachment for motion picture projectors and has for its primary object the provision of a small compact attachment for standard projectors now on the market and which may be readily applied to such projectors.

Another object of my invention is to provide an attachment of this character which provides guiding means for the film carrying the pictures and sound record, said guides being so disposed as to properly dispose the film in one position when it is desired to reproduce a sound record therefrom during the projection of the pictures, and which permits positioning the film in another position for feeding directly into the takeup magazine in the event that there is no sound record on the film or for some reason it is not desired to reproduce the sound record. In other words, I have provided means whereby if it is desired to project the pictures only without reproducing sound, the film may be threaded directly from the projector into the magazine without being threaded around the translation point of the sound reproducing mechanism.

Another object of my invention is to provide a novel type of focusing and adjusting means for the optical system used in connection with a reproducing attachment.

Still another object of my invention lies in the provision of a novel type of film feed sprocket by means of which the film is moved past the translation point.

A further and important object of my invention lies in the provision of a film tensioning device operable when the film is disposed around the sound reproducing device in such manner as to permit reproduction of the sound record on the film.

Other objects and advantages in details of construction and arrangement of parts will be apparent as the description proceeds, reference now being had to the figures of the accompanying drawings forming a part of this application and wherein like reference numerals indicate like parts.

In the drawings:—

Figure 1:
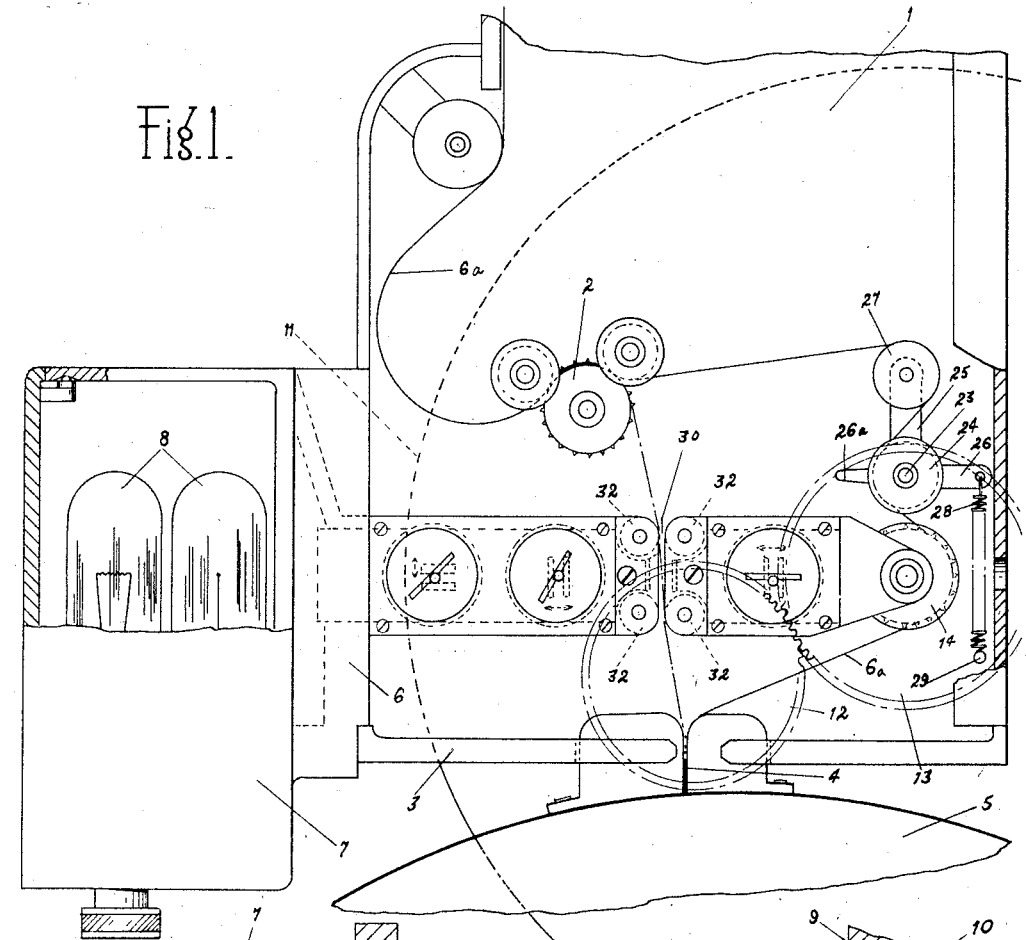
Figure 1 is a detail side view of my improved attachment in position in a motion picture projector, the details of the latter being omitted and parts broken away for clearness of illustration.

The reference character 1 designates generally the lower end of a standard motion picture projector, the details of which do not enter into this invention and have, therefore, been omitted. Suffice it to say that the projector is provided with a film feeding sprocket 2 and a base 3, secured to which base is the throat 4 of a film magazine 5 into which the film 6 is fed from the projector.

Mounted in the space in the lower end of the projector 1 between the sprocket 2 and the base 3 is my improved sound reproducing attachment consisting of a casting 6 secured to one end of which is a lamp housing 7 containing one or more lamps 8 used in the reproduction of the sound.

The opposite end of the casting 6 is provided with an angular extension 9 through which extends a shaft 10 carrying at its outer end a fly wheel 11 by means of which the shaft is rotated at a constant and uniform speed, such motion being imparted to the shaft and fly wheel by means of gears 12 and 13, the latter being secured upon the shaft 10. Any suitable driving power may be provided such as an electric motor (not shown) and by means of which the gears are driven.

Figures 2, 3:
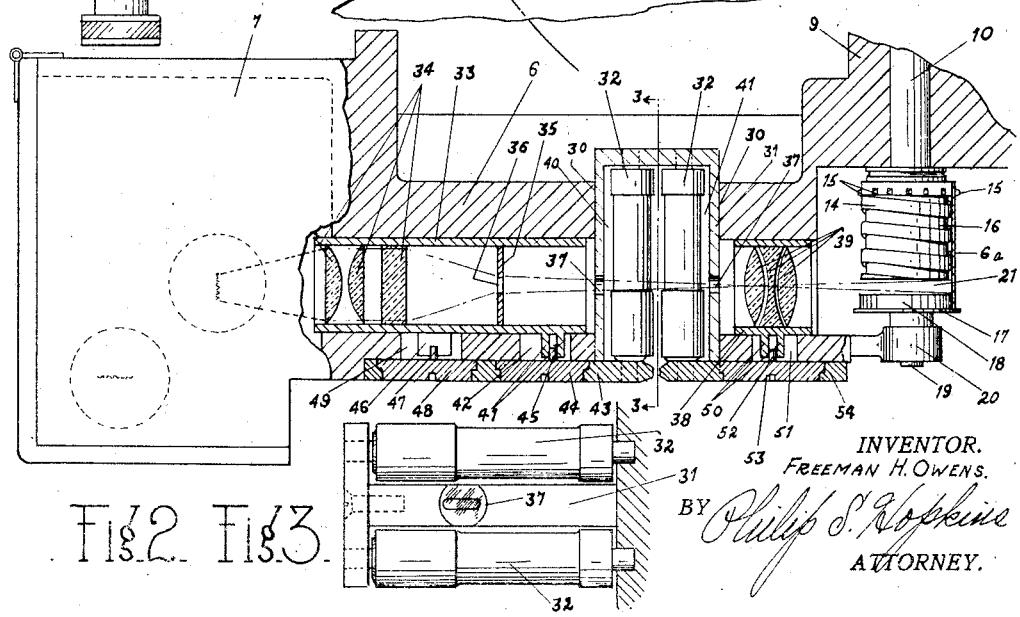
Figure 2 is a top plan view of the attachment, certain parts being in section for clearness of illustration.
Figure 3 is a detail view taken on the line 3—3 of Figure 2.
Figure 4:
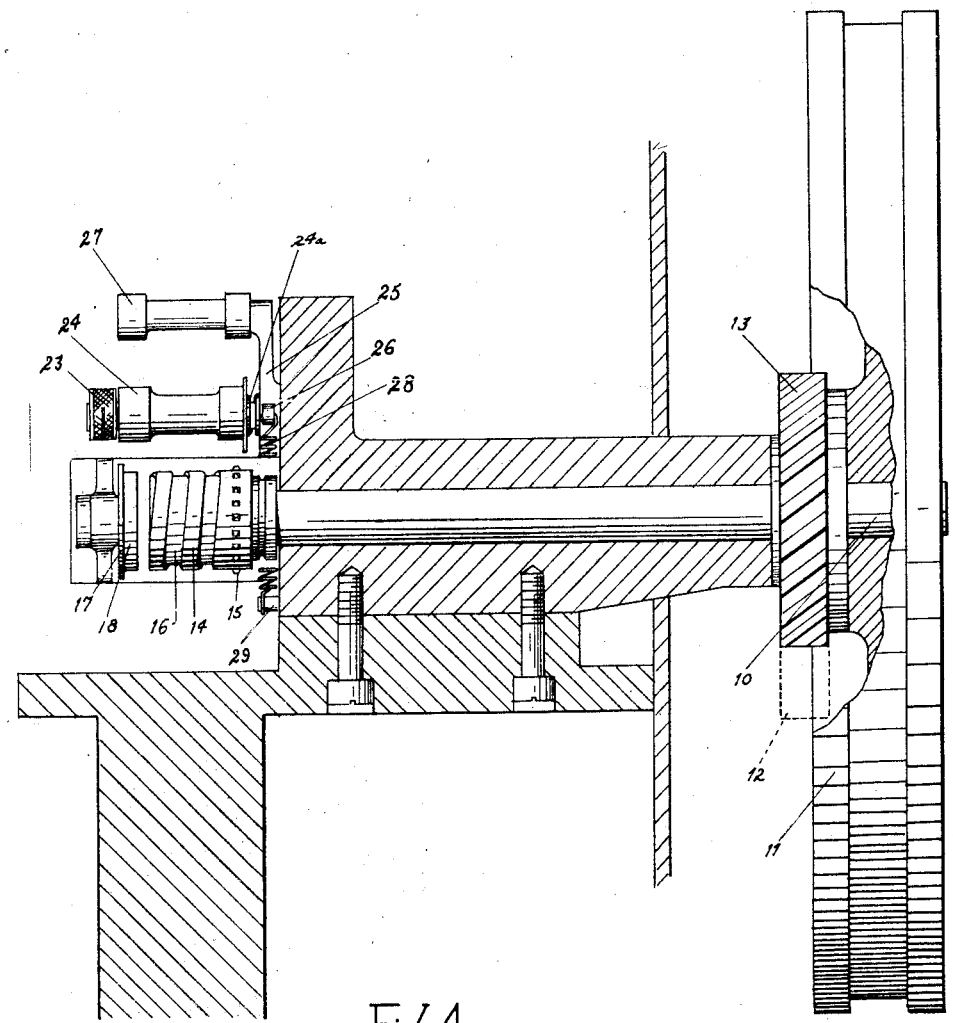
Figure 4 is a front view partly in section of the attachment in operative relation to the projector.

The opposite end of the shaft 10 carries a film sprocket 14 provided adjacent one end with teeth 15 and engaging with the perforations of the film 6 whereby to move the film when the same is threaded over said sprocket. The sprocket 14 is as indicated clearly in Figures 2 and 4, provided on its periphery with a spiral groove 16 which upon rotation of the sprocket serves to normally urge the film in one direction against the flange 17 of a roller 18 mounted upon a pintle 19 in longitudinal alignment with the shaft 10 and sprocket 14. The pintle 19 is supported in a bearing 20 carried by the casting 6.

It will be noted from Figures 2 and 4 that the roller 18 is spaced from the end of the sprocket 14, leaving an opening 21 therebetween to permit the light from the lamp 8 to reach the film 6 at the point where the sound record appears thereon whereby said sound record is illuminated for reproduction in the usual and well known manner.

Positioned above the sprocket 14 on a stud 23 extending outwardly from the casting 6 is a roller 24 over which the film 6 is guided before reaching the sprocket 14. This roller is so positioned that the film approaches the sprocket 14 at a point back of the front of the outermost periphery thereof, whereby the film is flexed longitudinally over the sprocket 14, thus preventing buckling or distortion of the film at the point of engagement with the sprocket 14 which of course is the sound translation point. It will be noted in Figure 2 that the film 6 after leaving the sprocket 14 is drawn rearwardly and fed down through the throat 4 of the magazine 5. The roller 24 is normally urged outwardly at its spindle by means of a coil spring 24a, the roller therefore not only serving to flex the film longitudinally but to guide it laterally with respect to the sprocket.

Pivotally mounted upon the spindle 23 of the roller 24 is a bell crank having an upwardly extending arm 25 and a laterally extending arm 26. The vertically extending arm 25 carries at its upper end a laterally disposed roller 27 over which the film 6 is threaded before threading around the roller 24 and sprocket 14. The outer end of the arm 26 of the bell crank has secured thereto a coil spring 28, the lower end of which is anchored to a pin 29 on the casting 6. The tendency of the spring 28 is to normally pull downwardly on the arm 26 and thus resiliently hold the roller 27 forwardly to a position substantially directly over the roller 24. Thus the film when threaded around the roller 24 and sprocket 14 is held in such threaded position under the tension of the spring 28. This tension roller takes up any slack and compensates for any tightness of the film which may occur through shrinkage of parts of the film or through improper feeding from the projector. The arm 26 of the bell crank carries an extension 26a in the form of a pointer cooperating with an indicating mark or scale on the casting whereby to indicate the proper position of the roller 27.

The casting 6 is split centrally as at 30 and at a point substantially directly below the feed sprocket 2 and above the throat 4 of the magazine 5. Therefore if the film which is being run through the projector does not have a sound record thereon, or if for some reason it is not desired to reproduce the sound record thereon, the film 6 may be threaded directly from the sprocket 2 through the split in the casting 6 into the takeup magazine 5, obviating the necessity of threading the film around the rollers 27, 24 and sprocket 14 of the sound reproducing device.

Disposed within the split portion 30 of the casting 6 is a housing 31 open at top and bottom to permit the film to pass therethrough, and in which housing are disposed the idler rollers 32 with which the film 6 engages as it passes through the housing to the magazine 5 preventing scratching thereof.

The casting 6 is by virtue of the split portion 30 thus divided into two sections. The rear section is bored axially to receive a tube 33 carrying at one end a condenser lens system 34 and intermediate its ends a plate or partition 35 provided with a slit 36. This tube 33 opens into the lamp housing 7 and is adapted to receive the light from the lamp 8, the condenser lenses serving to focus the light rays upon the slit 36, the aerial image of which passes through the openings 37 in the side walls of the housing 31 and in alignment between the upper and lower sets of rollers 32. Thus the illuminated image of the slit 36 passes into the opposite section of the casting 6 which is also bored longitudinally and provided with a tube 38 carrying a focusing lens 39 by means of which the aerial image of the slit 36 is focused upon the film 6 through the opening 21 between the sprocket 14 and roller 18, and at which point on the film the sound record is located.

It should be noted here that the sides of the housing 31 are provided with strips of glass or other transparent material 40 covering the openings 37 in the side walls of the housing whereby to prevent dust and dirt collecting within the lens system.

The tube 33 is provided on one side with a pair of spaced laterally extending lugs 41 extending into an opening 42 in the casting 6. A cover plate 43 closes the opening 42 and carries a rotatable disk 44 provided with a pin 45 engaging between the lugs 41. The pin 45 is disposed eccentrically to the center of the disk 44 whereby upon rotation of the disk 44 the pin 45 serves to engage one or other of the lugs 41 and moves the tube 33 carrying the lens 34 and slit 36 longitudinally for the purpose of focusing.

The tube 33 is also provided with a second pair of spaced lugs 46 disposed at right angles to the lugs 41 and between these lugs 46 extends a pin 47 carried eccentrically of a rotatable disk 48 mounted in the cover plate 43. The lugs 46 on the tube 33 extend into an opening 49 in the side of the casting 6 which opening is also covered by the cover plate 43. Obviously, rotation of the disk 48 will cause the pin 47 to engage one or other of the lugs 46 whereby to rotate the tube 33 within the casting whereby to properly adjust the position of the slit 36 with respect to the sound record on the film.

The tube 38 in the other section of the casting 6 is also provided with a pair of spaced laterally extending lugs 50 extending into an opening 51 in the casting 6 and between which lugs is engaged a pin 52 eccentrically mounted on a disk 53 rotatably secured in a cover plate 54. Rotation of the disk 53 serves to adjust the tube 38 longitudinally within the casting for focusing the lens 39.

It will thus be seen that I have provided an attachment for a motion picture projector which permits the threading of sound film for reproducing and which also permits threading of the film directly into the takeup magazine without passing around the various guide rollers and translation station if it is not desired to reproduce sound. I have also provided a novel tension roller for the film as it is fed to the translation station and a novel type of sprocket for feeding the film past such station. I have also provided an optical system for the reproduction of sound which is readily adjustable both longitudinally for focusing and rotatively for slit alignment.

Of course, changes may be made in details of construction and arrangement of parts without departing from the spirit and scope of my invention. I do not limit myself therefore to the exact form herein shown and described other than by the appended claims.

I claim:

1. A sound film reproducing attachment for motion picture projectors comprising a housing, means for moving a film past said housing in position for reproduction of a sound record on said film, and means provided for moving said film through said housing out of sound reproducing position, said last named means including an opening through said housing.

2. A sound film reproducing attachment for motion picture projectors comprising a housing, means for moving a film past said housing in position for reproduction of a sound record on said film, and means provided for moving said film through said housing out of sound reproducing position, said last named means including an opening through said housing, and anti-friction means in said opening engageable with said film.

3. A sound film reproducing attachment for motion picture projectors comprising a housing having an optical slit system therein, means for moving a film past said housing in operative relation to said system for reproduction of a sound record on said film, and means provided, including an opening through said housing whereby said film may be moved through said housing out of sound reproducing position.

4. A sound film reproducing attachment for motion picture projectors comprising a housing having an optical slit system therein, means for moving a film past said housing in operative relation to said system for reproduction of a sound record on said film, and means provided, including an opening through said housing whereby said film may be moved through said housing out of sound reproducing position, and transparent closures in said housing at said opening in alignment with said slit system past which said film is movable.

5. A sound film reproducing attachment for motion picture projectors comprising illuminating means, means for moving a film bearing a sound record in operative relation to said illuminating means including a sprocket engageable with said film and having a spiral groove in its periphery whereby to normally urge said film laterally in one direction.

6. A sound film reproducing attachment for motion picture projectors comprising illuminating means, means for moving a film bearing a sound record in operative relation to said illuminating means including a sprocket engageable with said film and having a spiral groove in its periphery whereby to normally urge said film laterally in one direction, and a spaced flanged roller in axial alignment with said sprocket for receiving and supporting one side of said film, the space between said sprocket and roller being in alignment with said illuminating means.

In testimony whereof, I affix my signature.

FREEMAN H. OWENS.